(12) United States Patent
Yamada

(10) Patent No.: US 10,674,038 B2
(45) Date of Patent: Jun. 2, 2020

(54) IMAGE PROCESSING APPARATUS, METHOD OF CONTROLLING SAME, AND STORAGE MEDIUM

(71) Applicant: CANON KABUSHIKI KAISHA, Tokyo (JP)

(72) Inventor: Tetsuya Yamada, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/436,081

(22) Filed: Jun. 10, 2019

(65) Prior Publication Data
US 2019/0297223 A1 Sep. 26, 2019

Related U.S. Application Data

(63) Continuation of application No. 16/013,134, filed on Jun. 20, 2018, now Pat. No. 10,356,279.

(30) Foreign Application Priority Data

Jun. 28, 2017 (JP) .................. 2017-126519

(51) Int. Cl.
| H04N 1/44 | (2006.01) |
| G06F 21/36 | (2013.01) |
| H04N 1/00 | (2006.01) |
| G06F 3/12 | (2006.01) |
| G06F 21/31 | (2013.01) |
| G06F 21/60 | (2013.01) |
| G06F 21/62 | (2013.01) |

(52) U.S. Cl.
CPC ......... *H04N 1/4413* (2013.01); *G06F 3/1222* (2013.01); *G06F 3/1238* (2013.01); *G06F 3/1267* (2013.01); *G06F 3/1271* (2013.01); *G06F 21/31* (2013.01); *G06F 21/36* (2013.01); *G06F 21/608* (2013.01); *G06F 21/6209* (2013.01); *H04N 1/00514* (2013.01); *G06F 3/1204* (2013.01)

(58) Field of Classification Search
None
See application file for complete search history.

(56) References Cited

U.S. PATENT DOCUMENTS

| 8,701,206 B2 | 4/2014 | Yamada |
| 9,986,117 B2 | 5/2018 | Yamada |
| 2010/0024010 A1 | 1/2010 | Baugher et al. |

(Continued)

FOREIGN PATENT DOCUMENTS

JP 2012254618 A 12/2012

*Primary Examiner* — Frantz Bataille
(74) *Attorney, Agent, or Firm* — Carter, DeLuca & Farrell LLP

(57) ABSTRACT

The present image processing apparatus stores setting information for whether to force setting of authentication information for each user. Furthermore, upon accepting a login request from a user, in a case where the stored setting information indicates forcing setting of authentication information, the image processing apparatus displays on a display unit a setting screen for setting authentication information to allow the user to set authentication information. In addition, the image processing apparatus executes login processing in accordance with a setting status of authentication information for the user.

8 Claims, 7 Drawing Sheets

(56) References Cited

U.S. PATENT DOCUMENTS

| | | | | |
|---|---|---|---|---|
| 2015/0082423 A1* | 3/2015 | Yamada | ............... | G06F 21/31 |
| | | | | 726/19 |
| 2015/0193417 A1* | 7/2015 | Yamamoto | ............ | G06Q 10/06 |
| | | | | 715/224 |
| 2015/0324675 A1* | 11/2015 | Morii | ............... | H04N 1/4413 |
| | | | | 358/1.14 |
| 2016/0292553 A1 | 10/2016 | Nagasawa et al. | | |

* cited by examiner

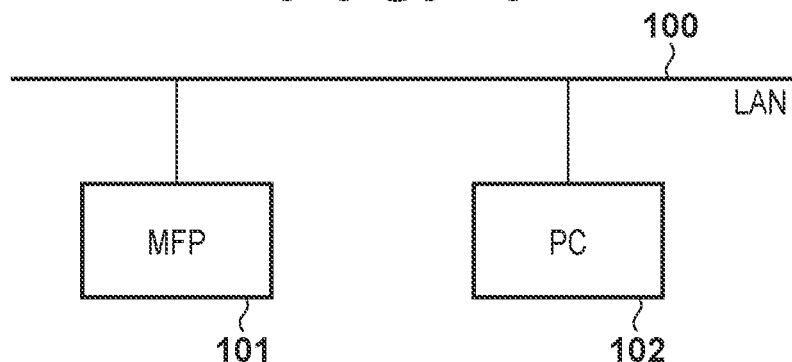
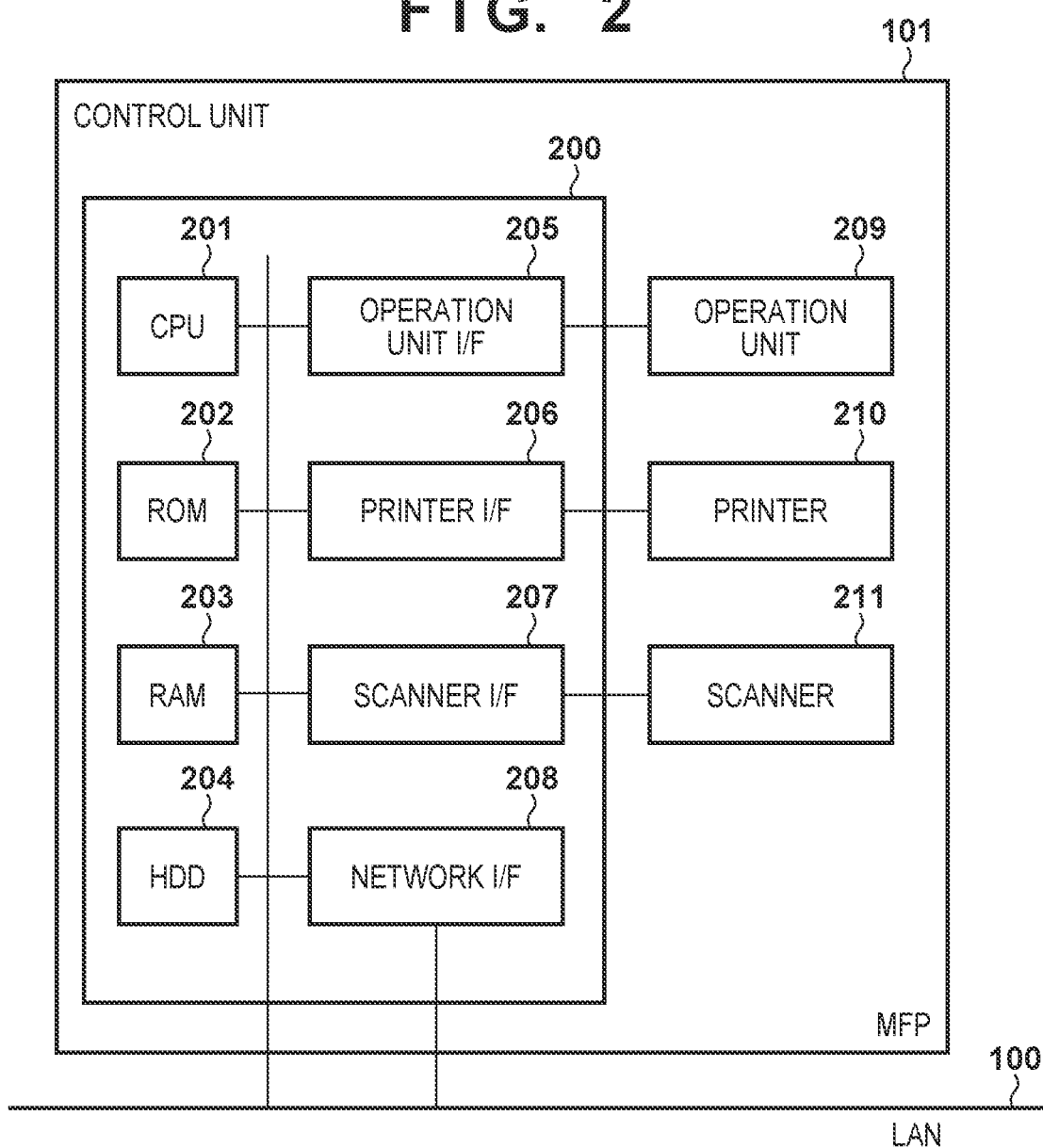

FIG. 4

| uid | SECRET NUMBER | PASSWORD | AUTHORITY | e-mail | FINAL LOGIN DATE/TIME |
|---|---|---|---|---|---|
| tanaka | **** | **** | ADMINISTRATOR | tanaka@xxx.com | 2017/4/1 15:00 |
| kikuchi | **** | **** | ADMINISTRATOR | kikuchi@xxx.com | 2017/4/1 10:10 |
| suzuki |  | **** | GENERAL | suzuki@xxx.com |  |

400

| SETTING ITEM | VALUE |
| --- | --- |
| 701 — SETTING OF SECRET NUMBER | FORCE |
| 702 — USE OF DEFAULT PASSWORD | PERMIT |
| 703 — MINIMUM NUMBER OF CHARACTERS FOR PASSWORD | 8 CHARACTERS |
| 704 — VALID PERIOD FOR PASSWORD | 90 DAYS |

F I G. 10
| REGISTRATION AGENT | REGISTRATION WITHOUT SECRET NUMBER |
|---|---|
| ADMINISTRATOR | POSSIBLE |
| GENERAL USER | PROHIBITED |
| SYSTEM | POSSIBLE |
F I G. 11
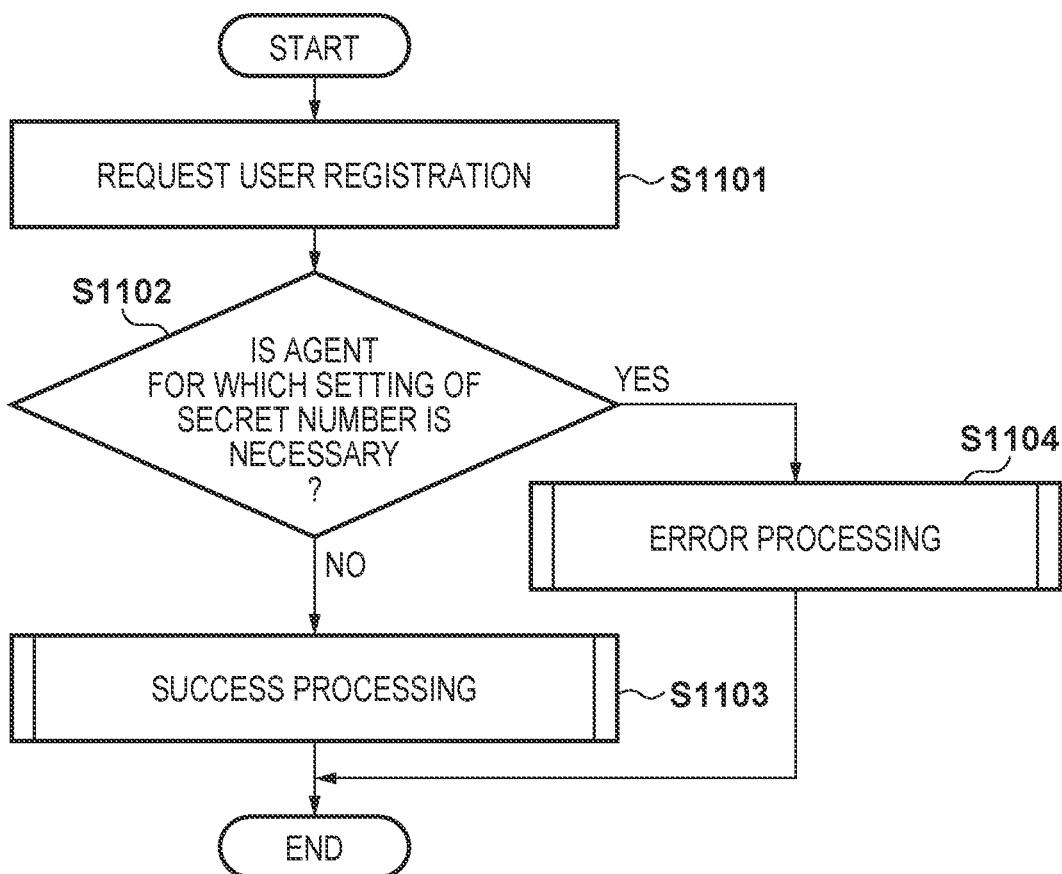

IMAGE PROCESSING APPARATUS, METHOD OF CONTROLLING SAME, AND STORAGE MEDIUM

CROSS REFERENCE TO RELATED APPLICATIONS

This application is a continuation of U.S. patent application Ser. No. 16/013,134, filed on Jun. 20, 2018, which claims the benefit of and priority to Japanese Patent Application No. 2017-126519 filed on Jun. 28, 2017, each of which are hereby incorporated by reference herein in its entirety.

BACKGROUND OF THE INVENTION

Field of the Invention

The present invention relates to an image processing apparatus, a method of controlling the same, and a storage medium.

Description of the Related Art

As an image processing apparatus, an MFP (Multi Function Peripheral) provided with an image reading apparatus, a printing apparatus, and a communication apparatus, and having image processing applications that can execute, for example, copying, printing, and transmission of a scanned image is known. Such an MFP is typically used by a plurality of users, and is provided with a user authentication function for performing personalization by restricting functions used by each authenticated user. In other words, in an MFP, a password (a secret number) is set for each user of the MFP, and user authentication is performed by requiring input of a password when a user logs in.

In addition, something referred to as a simple login function in which an icon of a registered user is displayed on a menu screen or the like of an MFP, and when the icon is selected, a customized login screen for the user is displayed is known. With the simple login function, input of a password is unnecessary, and it is possible to login to the MFP by a user pressing an icon associated with the user. Japanese Patent Laid-Open No. 2012-254618 proposes, as a function of the simple login function, a method for automatically registering a user by using a job owner name added in a print job subject to a print instruction from a PC for a user ID for MFP user identification.

However, there is a problem as is recited below in the foregoing conventional technique. With the foregoing conventional technique, in a login method for allowing a selected user to log into an information processing apparatus after the user is selected from a user selection screen, control for uniformly requiring input of a password for each user to log in is not envisioned. In contrast, in a case where input of a password is required, work for registering the password of each user becomes necessary, and the necessity to require an operation that is cumbersome for all users arises. Consequently, in a case where input of a password is required, providing a method for easily performing registration work or the like is a problem to be solved. In addition, with the foregoing simple login function, while input of a password is required at a time of login for a user whose password is set, login without requiring input of a password is permitted for a user whose password is not set. Consequently, there is room for improving security in a current simple login function.

SUMMARY OF THE INVENTION

The present invention enables realization of a mechanism for improving security and reducing a user operation related to authentication by suitably requesting setting of authentication information in accordance with a setting status of the authentication information in user authentication.

One aspect of the present invention provides an image processing apparatus comprising: a storage unit that stores setting information for whether to force setting of authentication information, for a predetermined login method; a memory device that stores a set of instructions; and at least one processor that executes the set of instructions to: accept a login request from a user, upon accepting a login request by the predetermined login method from a user for which authentication information is not set, in a case where the setting information stored in the storage unit indicates forcing setting of the authentication information, display on a display unit a setting screen for setting the authentication information to allow the user to set the authentication information, and execute login processing in accordance with a setting status of the authentication information for the user.

Another aspect of the present invention provides a method of controlling an image processing apparatus provided with a storage unit operable to store setting information on whether to force setting of authentication information, for a predetermined login method, the method comprising: accepting a login request from a user; upon accepting a login request by the predetermined login method from a user for which authentication information is not set, in a case where the setting information stored in the storage unit indicates forcing setting of the authentication information, displaying on a display unit a setting screen for setting the authentication information to allow the user to set the authentication information; and executing login processing in accordance with a setting status of the authentication information for the user.

Still another aspect of the present invention provides a non-transitory computer-readable storage medium storing a computer program for causing a computer to execute each step in a method of controlling an image processing apparatus provided with a storage unit operable to store setting information on whether to force setting of authentication information, for a predetermined login method, the method comprising: accepting a login request from a user; upon accepting a login request by the predetermined login method from a user for which authentication information is not set, in a case where the setting information stored in the storage unit indicates forcing setting of the authentication information, displaying on a display unit a setting screen for setting the authentication information to allow the user to set the authentication information; and executing login processing in accordance with a setting status of the authentication information for the user.

Further features of the present invention will be apparent from the following description of exemplary embodiments with reference to the attached drawings.

BRIEF DESCRIPTION OF THE DRAWINGS

FIG. 1 is a system configuration diagram relating to an MFP 101 according to an embodiment.

FIG. 2 is a block diagram illustrating a configuration of hardware of the MFP 101 according to the embodiment.

FIG. 4 is a view illustrating an example of management of users in a user authentication unit 302 according to the embodiment.

FIG. 10 is a view illustrating an example of a table for managing whether registration is permitted without setting a secret number for each registration agent according to the embodiment.

FIG. 11 is a flowchart illustrating a processing procedure of a simple login function automatic registration according to the embodiment.

DESCRIPTION OF THE EMBODIMENTS

Figure 3:
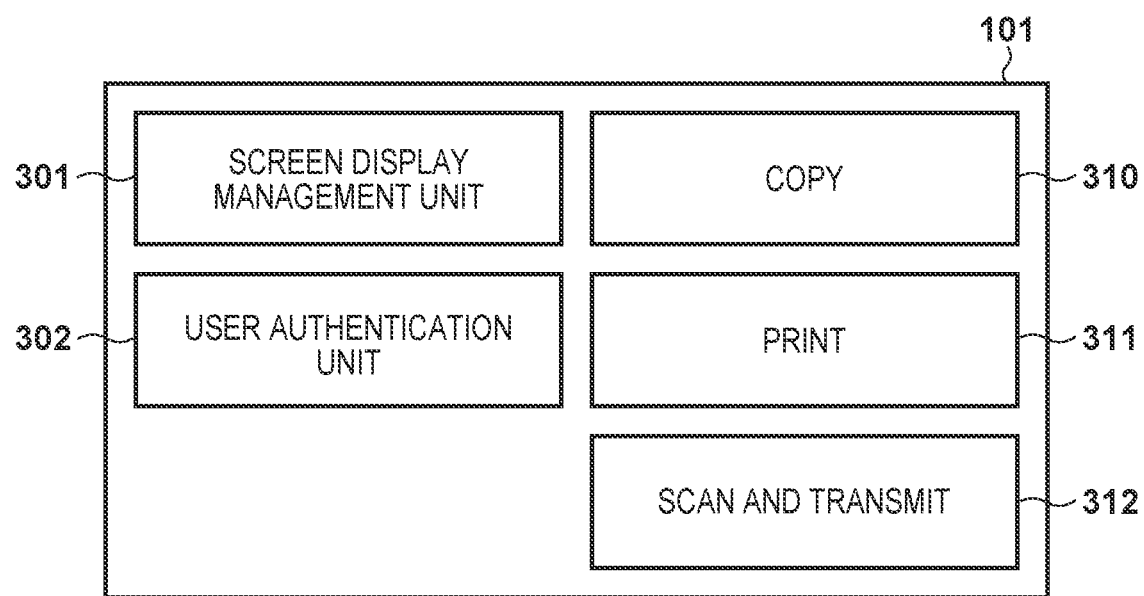
FIG. 3 is a block diagram illustrating a configuration of software of the MFP 101 according to the embodiment.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Configuration>

Below, an embodiment of the present invention will be described. Firstly, description is give regarding a system configuration of the present embodiment with reference to FIG. 1. The present system is equipped with an MFP (Multi Function Peripheral) 101 which is one example of an image processing apparatus and a PC (Personal Computer) 102 which is an external apparatus. These apparatuses are communicably connected with each other via a LAN 100. Note that, in the present embodiment, there is a system configuration that includes one of each of the MFP 101 and the PC 102, but this is only one example, and there is no intent to limit the present invention. For example, a plurality of MFPs or PCs may be included and another apparatus may also be included.

The MFP 101 includes a printer, a scanner, and the like, and is capable of printing, copying, scanning, and saving or transmitting a scanned document or the like. The PC 102 can access the MFP 101 and transmits a print job to the MFP 101 via a corresponding driver.

<Hardware Arrangement>

Next, description is given regarding a hardware configuration of the MFP 101 according to the present embodiment with reference to FIG. 2. The MFP 101 is equipped with a control unit 200, an operation unit 209, a printer 210, and a scanner 211. Also, the control unit 200 is equipped with a CPU 201, a ROM 202, a RAM 203, an HDD 204, an operation unit I/F 205, a printer I/F 206, a scanner I/F 207, and a network I/F 208.

The control unit 200 that includes the CPU 201 controls operations of the entire MFP 101. The CPU 201 performs various control such as transmission of an original scanning or image data by reading a control program stored in the ROM 202. The RAM 203 is used as a temporary storage area such as a main memory, a work area, or the like, of the CPU 201. The HDD 204 stores image data, various programs, or the like.

The operation unit I/F 205 connects the operation unit 209 with the control unit 200. The printer I/F 206 connects the printer 210 and the control unit 200. Image data which should be printed by the printer 210 is transferred from the control unit 200 via the printer I/F 206 and is printed on a printing medium in the printer 210. The scanner I/F 207 connects the scanner 211 and the control unit 200. The scanner 211 generates image data by scanning an image on an original, and inputs the image data into the control unit 200 via the scanner I/F 207. The network I/F 208 connects the control unit 200 (MFP 101) to the LAN 100. The network I/F 208 performs transmission/reception (for example, reception of a print job from the PC 102) of various information with an external apparatus over the LAN 100.

<Software Arrangement>

Next, description is given regarding a software configuration of the MFP 101 according to the present embodiment with reference to FIG. 3. The MFP 101 is equipped with a screen display management unit 301, the user authentication unit 302, a copy 310, a print 311, and a scan and transmit 312 as a software configuration.

Figures 6, 7:
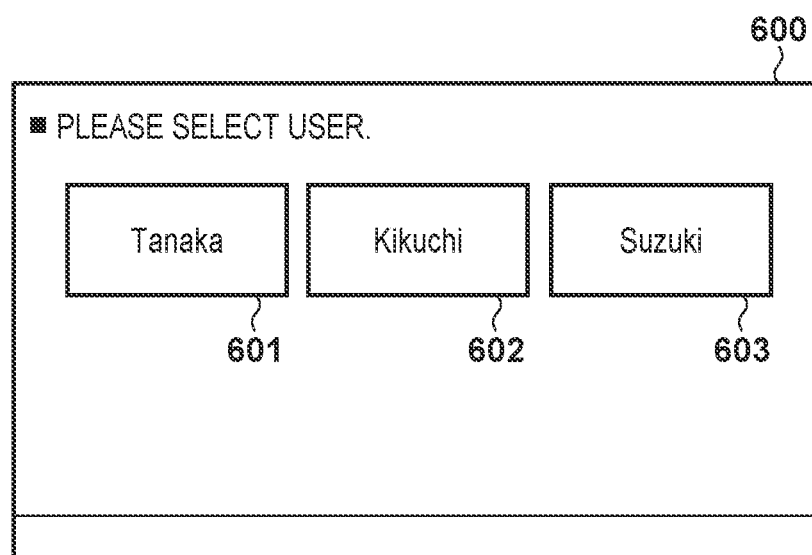
FIG. 6 is a view illustrating an example of a user authentication screen according to the embodiment.
FIG. 7 is a view illustrating an example of a DB of secret number and password operation settings according to the embodiment.

The screen display management unit 301 controls a screen that displays on the operation unit 209. The user authentication unit 302 provides a UI for managing a list of users that can use the MFP 101 and for user authentication. The user authentication unit 302 has a simple login function. The simple login function is a function that causes an icon for each user to display on the operation unit 209, and when a user presses an icon for oneself, an operation screen (a post-login screen) customized for the user is displayed as illustrated in FIG. 6 described later. Note, in cases where a selected user sets a password (secret number), an input of the password is requested. In other words, a login is permitted without requesting for an input of a password to users for whom a password is not set. Accordingly, in the simple login function according to the present embodiment, setting whether or not an input for a password is requested to the user regardless of whether or not a user password is set is made possible.

Also, an automatic registration function for automatically registering a logged in user is included in the simple login function. The automatic registration function is a function that, when a job is inputted to the image processing apparatus, automatically registers a user corresponding to a user ID included in the job as a logged in user of the simple login function. Description regarding details of the automatic registration function is given later using FIG. 9 to FIG. 11.

By virtue of the present embodiment, in cases where a user is newly registered by the automatic registration function, a user for whom a password is not set is allowed to be newly registered even if the password (secret number) setting in the simple login function is turned on. Then, when the new user logs in, a setting of a password is requested to the user (step S505 of FIG. 5). Also, in cases where an administrator newly registers a user, a user for whom a password is not set is allowed to be newly registered. Same as with the case of the automatic registration function, a setting of a password is requested to the user when the new user logs in for the first time. Meanwhile, in cases where a user who is not the administrator performs a new user registration manually, it is requested that a setting of a password also be performed together when the user registers. In this way, in the present invention, a method of registering a new user does not require setting of a password at a time of registration of a new user in a case of registration by an administrator or automatic registration, but requires setting of a password at a time of registration of a new user in a case of registration by a general user. In this way, it is possible to store setting information for whether to force setting of authentication information in association with a type of a user registration method.

The copy 310, the print 311, and the scan and transmit 312 are examples of applications that are operated by the MFP 101. The copy 310 is an application for executing printing in accordance with image data obtained by scanning an original. The print 311 is an application for accepting and holding a print job inputted from the PC 102, displaying a list of jobs inputted by a logged-in user, allowing a user to confirm details thereof, and then printing. The scan and transmit 312 is an application for externally transmitting, by email or the like, an image resulting from scanning by the scanner 211.

<User Table>

Next, with reference to FIG. 4, description is given regarding a user table 400 managed by the user authentication unit 302. The user table illustrated in FIG. 4 is an example, and there is no intent to limit the present invention.

In the user table 400 is defined, for each registered user, information on a user ID (uid), secret number, password, authority, electronic mail address (email), and final login date/time. "uid" is a user name for uniquely identifying a user. "secret number" is a character string configured from only numbers that is used when performing user authentication when using the MFP 101 via the operation unit 209. "password" is a character string used to perform user authentication when using the MFP 101 via a network. Note that the different terms secret number and password are used here, but they are substantially the same, and are authentication information for performing user authentication. Settings for operation of secret numbers/passwords is managed by a setting DB as illustrated by FIG. 7. "authority" is information for controlling whether to permit a function that can be operated by a user. Information on "authority" is registered with administrator or general. "email" indicates an electronic mail address. "final login date/time" indicates the date and time when the corresponding user last logged in.

Note that, as illustrated in FIG. 4, for the user whose user ID is "suzuki", a secret number is not set, and a final login date/time is blank because they have not logged in yet.

<User Authentication Processing Procedure>

Figure 5:
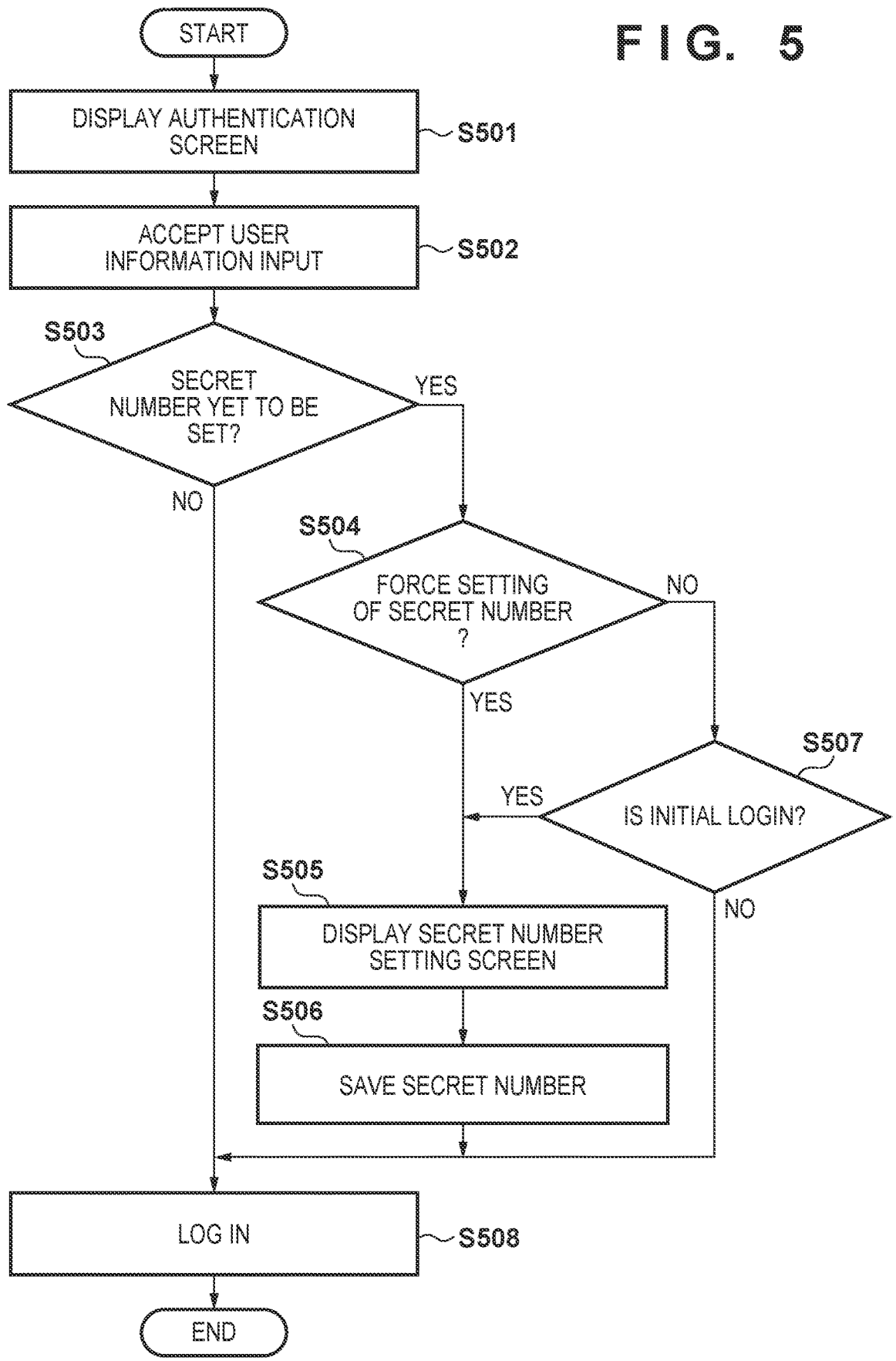
FIG. 5 is a flowchart of a user authentication according to the embodiment.

Next, with reference to FIG. 5, description is given regarding a user authentication processing procedure according to the present embodiment. Processing described below is realized by, for example, the CPU 201 reading a control program stored in the ROM 202 or the HDD 204 into the RAM 203, and executing it.

In step S501, upon accepting a login request with respect to the MFP 101 from a user, the screen display management unit 301 displays on the operation unit 209 an authentication screen provided by the user authentication unit 302. Note that this screen may be displayed on a display unit of the PC 102 when a user accesses the MFP 101 via the PC 102 which is an external apparatus. FIG. 6 illustrates one example of an authentication screen displayed on the operation unit 209 of the MFP 101 according to the present embodiment. Buttons displaying user IDs of users managed by the user authentication unit 302 are selectably displayed on a user authentication screen 600. The user authentication screen 600 is generated based on information of the user table 400 illustrated in FIG. 4. Consequently, buttons 601 to 603 corresponding to user IDs registered in the user table 400 are comprised and displayed.

Next, in step S502, the user authentication unit 302 accepts selection of a user with respect to the buttons 601 to 603, via the user authentication screen 600 displayed on the operation unit 209. When a button is selected in step S502, the processing proceeds to step S503, and the user authentication unit 302 determines whether a secret number is not yet set. Specifically, the user authentication unit 302 determines that the secret number is not yet set if a secret number of the user corresponding to the selected button is not defined in the user table 400. If the secret number is not yet set, the processing proceeds to step S504, and if it is set the processing proceeds to step S508.

In step S504, the user authentication unit 302 determines whether to force setting of the secret number for the user whose secret number is not yet set. Specifically, the user authentication unit 302 refers to a setting table 700 illustrated in FIG. 7 in order to determine whether to force setting of the secret number. Values are set to a plurality of setting items 701 to 704 in the setting table 700. Whether to force setting of a secret number is set to a setting item 701. The setting item 701 is setting information indicating whether to force setting of authentication information for a predetermined login method (for example, a simple login function). Whether to permit usage of a default password is set to the setting item 702. A minimum number of characters for a password is set to the setting item 703. In the example illustrated in FIG. 7, this is set to 8 characters. A valid period for a password is set to the setting item 704. Note that these pieces of setting information can be made by an administrator, for example, and a screen for accepting these settings may displayed on the operation unit 209 in advance. This setting screen is not shown graphically, but may be a screen that allows whether to force setting of authentication information (a secret number or a password) to be selected. In addition, it is desirable that these pieces of setting information be set in advance as default values at a time of shipment from a factory of a product. In the example illustrated in FIG. 7, this is set to 90 days. The user authentication unit 302 refers to the setting item 701 to determine whether the setting for forcing setting of a secret number is set. In a case of forcing setting of a secret number the processing proceeds to step S505, and otherwise the processing proceeds to step S507.

In step S507, the user authentication unit 302 determines whether it is an initial login. Specifically, if the final login date/time for the user is not defined in the user table 400, the user authentication unit 302 determines that this is an initial login and proceeds to step S505, and if a final login date/time is defined, the user authentication unit 302 determines that this is not an initial login and proceeds to step S508.

Figure 8:
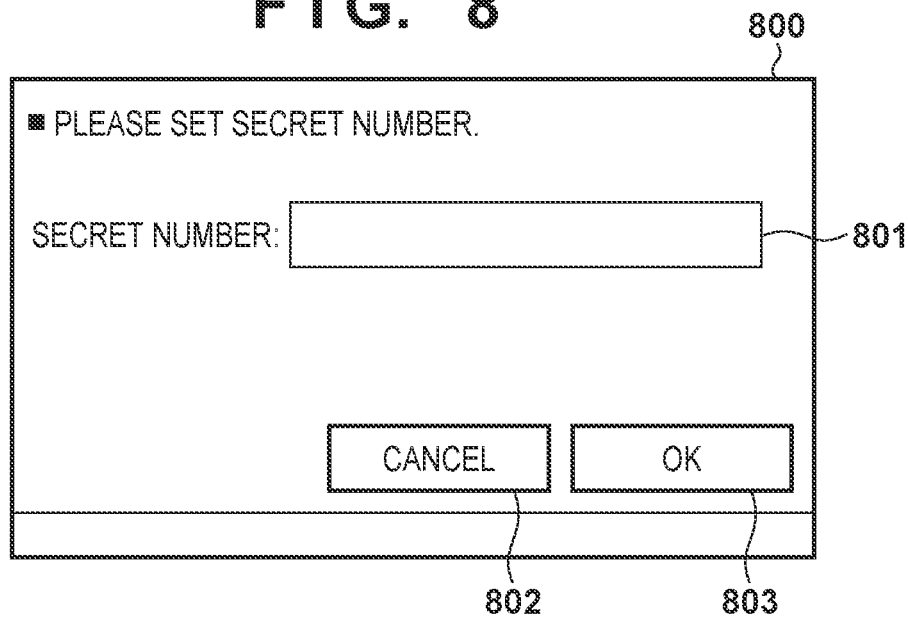
FIG. 8 is a view illustrating an example of a setting UI for the secret number according to the embodiment.

In step S505, the screen display management unit 301 displays a secret number setting screen on the operation unit 209. FIG. 8 illustrates a secret number setting screen 800 that is displayed on the operation unit 209. The secret number setting screen 800 is configured by including a secret number input region 801, a cancel button 802, and an OK button 803. A secret number is inputted to the secret number input region 801 in accordance with a user input via a hardware key (not shown), or the like. When the cancel button 802 is operated in a state where a secret number is inputted to the secret number input region 801, the secret number is not registered and the screen of the operation unit 209 returns to the screen displayed before displaying the secret number setting screen 800. In contrast, when the OK button 803 is operated in a state where a secret number is inputted to the secret number input region 801, the inputted secret number is finalized. According to the present embodiment, at a time of an initial login or the like, in step S505 the secret number setting screen 800 is displayed and setting of a secret number (password) is requested. Consequently, even in a case where setting of a secret number or the like at a time of user registration by a registration agent in automatic registration in the simple login function described below is omitted, it is possible to request setting of the secret number or the like at a time of a subsequent login (step S505).

The description of FIG. 5 is returned to. In step S506, the user authentication unit 302 saves the secret number accepted via the secret number setting screen 800 to the user table 400, and advances the processing to step S508. Note that, in a case of transitioning to step S508 after determining that this is not an initial login in step S507, input of a secret number is not requested in login processing. Such a case is where a secret number was not set in an initial login, and input of a secret number or a password is not requested at a time of a subsequent login. Note that the present invention is not limited to such control, and may perform control so as to prohibit not setting a secret number or the like at a time of an initial login.

Note that, in a case of forcing setting of a secret number (password), control may be performed so that the "OK" button 803 cannot be selected in a state where a secret number is not inputted in the secret number input region 801 in the secret number setting screen 800.

Finally, in step S508, the user authentication unit 302 executes login processing in accordance with the set secret number, and the processing ends. During the login processing, the user authentication unit 302 requests the user to input authentication information such as a secret number that is set. Note that, the present embodiment, the processing branches after determines whether there is an initial login in a case of not forcing setting of a secret number (step S507), but the present invention is not limited to this. For example, in a case of not forcing a secret number to be set, settings and controls so as to proceed to the login processing of step S508 in the present state may be provided. In such a case, the user authentication unit 302 does not request input of a secret number (password) during login processing. In addition, configuration may be taken so that, during the login processing, the user authentication unit 302 controls so as to not permit login of a user if a secret number is not set, irrespective of the setting of a secret number or the like being necessary. Note that such control may be changed in accordance with setting information.

<User Registration at Time of Print Job Input>

Figure 9:
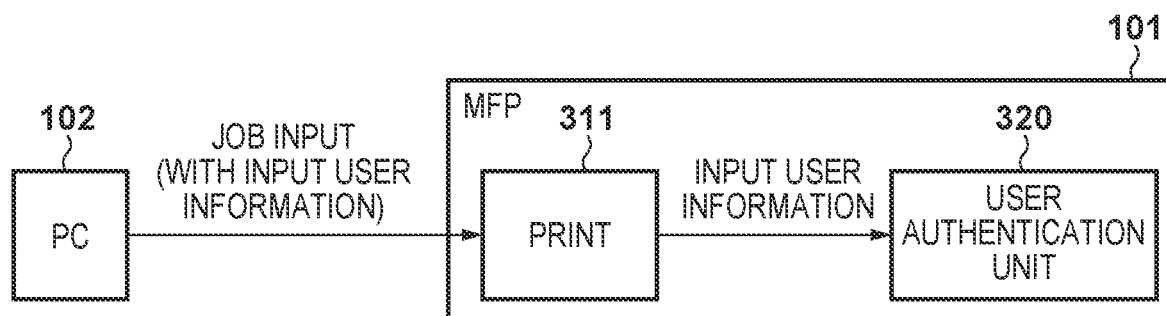
FIG. 9 is a view illustrating a flow of an automatic creation of a user by a print job input according to the embodiment.

Next, with reference to FIG. 9 through FIG. 11, description is given regarding user registration at a time of a print job input, according to the present embodiment. The user authentication unit 302 provides a plurality of methods as methods for user registration. For example, the user authentication unit 302 provides a function for performing user registration via an interface displayed by the operation unit 209 or an interface provided via the Web (input from operation unit UI/Web UI). In addition, as functions included in a simple login function, the user authentication unit 302 provides a function for performing user registration in accordance with importing user data, or a function for using user information included in a print job accepted from an external apparatus such as the PC 102 to automatically perform registration.

Description is given in detail below regarding a processing procedure and control of an automatic registration function in the simple login function. By virtue of the present embodiment, it is possible to cause an agent capable of registration to differ for each registration method. For example, all users can register themselves in accordance with "input from an operation unit UI/Web UI". In addition, a user having an "administrator" authority can register a user in accordance with "input from an operation unit UI/Web UI" and "importing user data". "Automatic registration using user information included in a print job" is registration that is automatically performed by the user authentication unit 302 and not by a user explicitly performing a registration operation. Note that a registration procedure for a time of a print job input is described later using FIG. 11.

Here, with reference to FIG. 9, description is given regarding "automatic registration using user information included in a print job". A print job inputted to the MFP 101 from the PC 102 is provided with input user information. The print 311 that receives the print job conveys the input user information to the user authentication unit 302 before processing the held print job. The user authentication unit 302 registers a user by taking the received input user information as a user ID. A check for items (required items) that are not allowed to overlap with other users (for example, a user ID) is performed at the time of user registration.

In the setting table 700 illustrated in FIG. 7, in the case where forcing setting of a secret number is set, the secret number is a required item. However, the secret number is something that should be set by the actual user. Accordingly, according to the present embodiment, the user authentication unit 302 controls whether to have it be necessary to add a secret number at a time of a registration operation for each registration agent, in accordance with a table 1000 illustrated by FIG. 10. As illustrated in FIG. 10, types of registration agents include "administrator", "general user", and "system". In FIG. 10, there is a setting for permitting automatic registration without setting a secret number in the case where the registration agent is "administrator" or "system", and automatic registration is prohibited when the registration agent is a "general user". Note that these settings can be made by an administrator, for example, and a screen for accepting these settings is displayed on the operation unit 209 in advance.

With reference to FIG. 11, description is given regarding a processing procedure for automatic registration for the simple login function at a time of receipt of a print job in the present embodiment. Processing described below is realized by, for example, the CPU 201 reading a control program stored in the ROM 202 or the HDD 204 into the RAM 203, and executing it.

In step S1101, the user authentication unit 302 accepts a request to register a user. Next, in step S1102, the user authentication unit 302 determines whether the registration agent needs to set a secret number. For example, the user authentication unit 302 refers to the authority of the user, the setting table 700, and the table 1000 to determine whether the user is a user for which setting of a secret number is required. If setting of a secret number is not necessary (when the registration agent is "administrator" or "system") the processing proceeds to step S1103, and if setting of a secret number is necessary (when the registration agent is a "general user"), the processing proceeds to step S1104.

In step S1103, the user authentication unit 302, without setting a secret number, uses the user information included in the print job to automatically register the user in the user table 400 as a newly registered user, and the processing ends. Meanwhile, in step S1104, the user authentication unit 302 executes error processing without registering the user, and the processing ends. In the error processing, that user registration corresponding to the user information included in the print job cannot be performed may be notified to the PC 102.

As described above, the image processing apparatus according to the present embodiment stores setting information for whether to force setting of authentication information for each user. Furthermore, upon accepting a login request from a user, in a case where the stored setting information indicates forcing setting of authentication information, the image processing apparatus displays on a display unit a setting screen for setting authentication information to allow the user to set authentication information. In addition, the image processing apparatus executes login processing in accordance with a setting status of authentication information for the user. Furthermore, in a case of performing automatic registration for a simple login function when a print job is received, the image processing apparatus controls whether to automatically register a user in accordance with the authority of a user who is a registration agent. In this way, by virtue of the present embodiment, it is possible to improve security and reduce a user operation related to authentication by suitably requesting setting of authentication information in accordance with a setting status of the authentication information in user authentication. In addition, by virtue of the present embodiment, forcing all users to set authentication information even in the case of a simple login function can be set.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A multi-function apparatus having a scanner function and a printer function, the multi-function apparatus comprising:
   a memory device that stores a set of instructions; and
   at least one processor configured to, by executing the set of instructions, function as:
      a login unit configured to display an icon for login for each registered user, accept a selection for the icon, and make the user corresponding to the accepted icon to log in the multi-function apparatus;
      a storage unit configured to store authentication information asked in a case where it is necessary to input authentication information when logging in, for a login method by the login unit; and
      an authentication information request unit configured to, upon accepting the selection for the icon, in a case where the user first logs in, display on a display unit an inputting screen for inputting the authentication information to cause the user to input the authentication information,
   wherein the authentication information request unit displays on the display unit the inputting screen for causing the user to input the authentication information in a case where the user first logs in even if it is not necessary to input authentication information.

2. The multi-function apparatus according to claim 1, wherein the at least one processor is further configured to function as:
   a register unit configured to, upon accepting a print job from an external apparatus for performing printing in the multi-function apparatus, automatically register the user in accordance with user information included in the print job.

3. The multi-function apparatus according to claim 2, wherein
   the storage unit further stores information on whether to permit automatic registration for each user authority, and
   the register unit, for the authority of the user, in a case where the information stored in the storage unit indicates permitting the automatic registration, further automatically registers the user, and otherwise not automatically registers the user.

4. The multi-function apparatus according to claim 3, wherein the authority of the user is set in accordance with a user type.

5. The multi-function apparatus according to claim 1, wherein the login unit, in a case where the user first logs in, does not permit login for a user for which the authentication information is not input.

6. The multi-function apparatus according to claim 1, wherein the at least one processor is further configured to function as:
   a setting unit configured to set whether it is necessary to input authentication information in association with a type of a user registration method.

7. A method of controlling a multi-function apparatus having a scanner function and a printer function, the method comprising:
   displaying an icon for login for each registered user, accept a selection for the icon, and make the user corresponding to the accepted icon to log in the multi-function apparatus;
   storing, in a storage unit, authentication information asked in a case where it is necessary to input authentication information when logging in, for a login method;

upon accepting the selection for the icon, in a case where the user first logs in, displaying on a display unit an inputting screen for inputting the authentication information to cause the user to input the authentication information; and displaying on the display unit the inputting screen for causing the user to input the authentication information in a case where the user first logs in even if it is not necessary to input authentication information.

8. A non-transitory computer-readable storage medium storing a computer program for causing a computer to execute each step in a method of controlling a multi-function apparatus having a scanner function and a printer function, the method comprising:

displaying an icon for login for each registered user, accept a selection for the icon, and make the user corresponding to the accepted icon to log in the multi-function apparatus;

storing, in a storage unit, authentication information asked in a case where it is necessary to input authentication information when logging in, for a login method;

upon accepting the selection for the icon, in a case where the user first logs in, displaying on a display unit an inputting screen for inputting the authentication information to cause the user to input the authentication information; and displaying on the display unit the inputting screen for causing the user to input the authentication information in a case where the user first logs in even if it is not necessary to input authentication information.

* * * * *